United States Patent
Wilczek et al.

(10) Patent No.: US 10,769,706 B2
(45) Date of Patent: *Sep. 8, 2020

(54) PROVIDING ACCESS TO A NETWORKED APPLICATION WITHOUT AUTHENTICATION

(71) Applicant: Coupa Software Incorporated, San Mateo, CA (US)

(72) Inventors: Donna Wilczek, Sonoma, CA (US); Gabriel Perez, San Mateo, CA (US); Robert Bernshteyn, San Mateo, CA (US); Raja Hammoud, San Mateo, CA (US); David Williams, San Mateo, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,977

(22) Filed: Sep. 8, 2017

(65) Prior Publication Data

US 2017/0372404 A1    Dec. 28, 2017

Related U.S. Application Data

(63) Continuation of application No. 14/504,721, filed on Oct. 2, 2014, now Pat. No. 9,785,999.

(51) Int. Cl.
*G06Q 30/00* (2012.01)
*G06Q 30/06* (2012.01)
*G06Q 30/04* (2012.01)

(52) U.S. Cl.
CPC ......... *G06Q 30/0633* (2013.01); *G06Q 30/04* (2013.01)

(58) Field of Classification Search
CPC .................... G06Q 30/0633; G06Q 30/04
(Continued)

(56) References Cited

U.S. PATENT DOCUMENTS 5,918,216 A * 6/1999 Miksovsky ............ G06Q 20/10
                                                      705/35
8,510,813 B2 * 8/2013 Kumar ..................... G06F 21/31
                                                       726/7

(Continued)

OTHER PUBLICATIONS

Wilczek, U.S. Appl. No. 14/504,721, filed Oct. 2, 2014, Office Action, dated Jan. 27, 2017.

(Continued)

*Primary Examiner* — Patrick McAtee
(74) *Attorney, Agent, or Firm* — Hickman Palermo Becker Bingham LLP (57) ABSTRACT

A method and apparatus are herein disclosed for allowing suppliers to generate an invoice from a purchase order without requiring them to log in or pre-register with a networked application. Implementation is provided by having a first user provide a first document to a networked application. An electronic notification is dispatched to a receiver for the first document with a unique link to a data entry page within the networked application. The data entry page is sandboxed with limited functionality within the networked application, but accepts data from the receiver to be sent directly into the first user's system.

18 Claims, 9 Drawing Sheets

(58) Field of Classification Search
USPC .......................................... 705/51, 26.35, 44
See application file for complete search history.

(56) References Cited

U.S. PATENT DOCUMENTS

| | | | | |
|---|---|---|---|---|
| 2002/0107794 | A1* | 8/2002 | Furphy | G06Q 10/0875 |
| | | | | 705/40 |
| 2002/0120642 | A1 | 8/2002 | Fetherston | |
| 2003/0172036 | A1* | 9/2003 | Feigenbaum | G06Q 20/24 |
| | | | | 705/64 |
| 2004/0103367 | A1 | 5/2004 | Riss et al. | |
| 2004/0177326 | A1 | 9/2004 | Bibko et al. | |
| 2009/0099971 | A1* | 4/2009 | Salemme | G06Q 10/02 |
| | | | | 705/80 |
| 2010/0202698 | A1 | 8/2010 | Schmidtler et al. | |
| 2011/0320310 | A1* | 12/2011 | Brewer | G06Q 20/40 |
| | | | | 705/26.35 |
| 2013/0042295 | A1* | 2/2013 | Kelly | G06F 21/53 |
| | | | | 726/1 |
| 2013/0346331 | A1 | 12/2013 | Giovannetti | |
| 2014/0020073 | A1* | 1/2014 | Ronda | G06F 21/31 |
| | | | | 726/7 |
| 2014/0298421 | A1 | 10/2014 | Johnson | |
| 2016/0098779 | A1 | 4/2016 | Wilczek | |
| 2016/0196254 | A1 | 7/2016 | Wilezek | |

OTHER PUBLICATIONS

Wilczek, U.S. Appl. No. 14/504,721, filed Oct. 2, 2014, Notice of Allowance, dated Jun. 2, 2017.
U.S. Appl. No. 14/504,721, filed Oct. 2, 2014, Office Action, dated Sep. 26, 2016.
U.S. Appl. No. 14/504,721, filed Oct. 2, 2014, Final Office Action, dated Mar. 8, 2016.
U.S. Appl. No. 14/504,721, filed Oct. 2, 2014, Restriction Requirement, dated Jan. 15, 2015.
U.S. Appl. No. 14/504,721, filed Oct. 2, 2014, Office Action, dated Jul. 7, 2015.
U.S. Appl. No. 14/504,721, filed Oct. 2, 2014, Office Action, dated Mar. 8, 2016.

* cited by examiner

601
Purchase Order Electronic Notification

603
Logo

617
Brand X Inc.
Purchase Order

Supplier Name 605

| 607 |
| --- |
| Supplier Address |

| 619 |
| --- |
| PO Details |

PO NUMBER          19
DATE                     08/11/2014
PAYMENT TERMS
SHIPPING TERMS
CURRENCY           USD
CONTRACT
CONTACT            Name/email Ship To Field 609

| 611 |
| --- |
| Buyer Address 1 |

Bill To Field 613

| 615 |
| --- |
| Buyer Address 2 |

| 621 |
| --- |
| Line Item Details |

| Line | Description | Qty | Unit | Price | Total |
| --- | --- | --- | --- | --- | --- |
| 1 | Laptop | 10 | Each | 1,199.00 | 11,990.00 |
| 2 | Monitors | 10 | Each | 150.55 | 1505.50 |
| 3 | Wireless Keyboards | 8 | Each | 69.00 | 552.00 |

28 Units   14,047.50 USD

Link 623        Comments 625        Acknowledge PO 627

FIG. 6

701
Data Entry Invoice Page

Create Invoice 703

Supplier Name 705

Status 707  Draft

Invoice # 709

Invoice Date 711  8/13/2014

Invoice Control Total 713

Supplier Note 715

Data Source 717

Reject 719

Image Scan 721  Add Image | URL

Attachments 723  Add File | URL | Text

Accounting Details 725

Payment Term 727  Net 30 ▼

Chart Of Accounts 729  Ace Corporate

Currency 731  USD

Remit-To 733

Location Code 735

Line Item Details 737

| Line | Type | Description | Qty | Unit | Price | Total | Taxation |
|---|---|---|---|---|---|---|---|
| 1 | Laptop | | 10 | Each | 1,199.00 | 11,990.00 | |
| 2 | Monitors | | 10 | Each | 150.55 | 1505.50 | |
| 3 | Wireless Keyboards | | 8 | Each | 69.00 | 552.00 | |

| PO-Line 739 | Contract 741 | Billing 743 | Period 745 | UNSPSC 747 |
|---|---|---|---|---|
| 3420-1 | | SF-Oper. ▼ | Net 30 ▼ | |

Totals 749    28 Units  14,047.50 USD

FIG. 7

801
Confirmation Message

---

803

From: Sender
Date: Mon, July 29, 2014 at 5:05 PM
Subject: Invoice INV12309 Submitted Successfully
To: Receiver

---

Invoice INV12309 Submitted Successfully 805

807    809

Good news,

This message confirms that your invoice was submitted successfully to your customer, (Name).

Next Steps:
Your customer still needs to process the invoice. If you enable notifications when you submitted the invoice, we'll send you:
- An email when the invoice is marked as 'Approved to Pay'
- An email if the invoice is marked as 'Paid' by your customer
- An email if the invoice is marked as 'Disputed' if there is a problem approving it To check the status of the invoice or payment, use the link below:

View Invoices against this PO

If you have any questions you can add comments there, or yo can simply contact your customer through normal channels.

Thanks for invoicing electronically!

PROVIDING ACCESS TO A NETWORKED APPLICATION WITHOUT AUTHENTICATION

BENEFIT CLAIM

This application claims the benefit as a Continuation of application Ser. No. 14/504,721, filed Oct. 2, 2014 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to a computer-implemented method and system for accessing a web application, and more specifically deep linking access to invoice forms through electronic notification.

BACKGROUND

E-Procurement software facilitates the purchase and sale of goods and services through the interne and intranet networking systems. Generally, the system starts with an employee at a business identifying a purchase need. The employee may then log in and fill out a formal written request called a requisition to request fulfilment of that need. The requisition is then submitted to higher level employees or managers for approval.

Depending on the workflow of the requisition document, multiple managers may need to approve a requisition. Each level of approval would require some form of authentication and authorization. Eventually, the approved requisition is transformed into a purchase order issued to a supplier. Most procurement software then sends this purchase order as an email to the supplier. In many systems, this is the end of the process.

In other approaches, the supplier is requested to register and log in to a special procurement system to view purchase order details and turn the purchase order into an invoice. The benefit of this approach is that a supplier does not have to generate an invoice from scratch. Instead, the purchase order information is mirrored to an invoice generation form, and the supplier only needs to add additional invoice data to the form before publishing the data as an invoice and sending it back to the buyer.

While this functionality seems highly efficient, many suppliers fail to take advantage of the purchase order information being imported directly into the invoice form because of the work associated with the registration and log in requirements. These requirements are a necessary prophylactic measure for the buyer or any intermediary entity maintaining the software to prevent bots and would be attackers from accessing the system. Information in the system includes not only requisition, purchase order, and invoice data for every transaction, but also names, passwords, information of employees and vendors, shipping and billing information, inventory, projects, bids, contracts, discounts, liquidity, supplier performance, disputed expenses, forecasts, and other information that may or may not be related to enterprise resource planning and electronic data interchange software.

Registration and logging in are methods of effecting computing security. In the field of computing, a secure system includes authentication, ensuring a user is who he or she claims to be, and authorization, defining the access rights of each user. Authentication is commonly based on connecting an account to one of three factors: something the user "has", something the user "knows", or something the user "is." Authorization is commonly based on associating an account with a permission group for a group of files. The permission group has access to different rights with regard to a file. For example, an account in the permission group "super user" may have four access permissions (Read, Write, Execute, and Delete) to every file in a system while an account in the permission group "guest" may only have read and write access to some files in the system.

An additional setback to using this functionality is user interface and user experience. Essentially, suppliers are reluctant to create account information and learn a new interface for an external system. If the log in name and password are standardized within a company for outside services, then creating an account with that name and password requires some form of consideration on whether the site is a trusted site. After providing the sign up information, a user is likely to be sent to a home page/splash page. Navigating around a site looking for the necessary purchase order to invoice form can be a frustrating experience. The authentication and authorization for a supplier account increases the site wide bounce rate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Some embodiments provide for temporarily granting an unauthenticated client access to a secure application hosted on a network. A method of authentication is substituted by requiring the client use something they have to gain access to the page—clicking a unique link given to them through an electronic notification. The benefit of granting access to a portion of the system through a single action is minimizing site wide bounce rate and significantly shortening the time of tasks that only require access to one page in the system.

Security is provided for the entire application by segregating the portion of the application accessible by unauthenticated users from the rest of the application. Security sandbox technology prevents an attacker from gaining access or knowledge about the secure system. In particular, the unauthenticated client may be prevented from running scripts in the sandboxed page. Any data entered in the page may be scanned for suspicious code before forwarding it on to a secure portion of the system. Furthermore, access to pages other than the sandboxed page(s) from a sandboxed page may be redirected to a log in page using route handlers.

The application of this service is particularly useful in the E-Procurement context. In the E-procurement process, a buying entity (hereinafter "buyer") needs to perform a series of steps requiring authentication and different levels of authorization before a purchase order is sent to a supplier. After receiving the purchase order, the supplier (also known as "seller") only needs to perform a minimal amount of data entry to enable an application to transform a purchase order into an invoice. Because most of the data was already entered by the authenticated buyer, and the data will be re-checked later through a matching process, the seller can be granted unauthenticated access to the buyer's E-procurement system to enter a minimal amount of data.

The buyer and the seller gain the benefit of an integrated system where there is less data entry by each user and less likelihood to have a disjunction between the terms of the purchase. However, the buyer is not required to become fully integrated into the system by creating an account and learning all of the details of the system.

Phases of the E-Procurement Process

Figure 1:
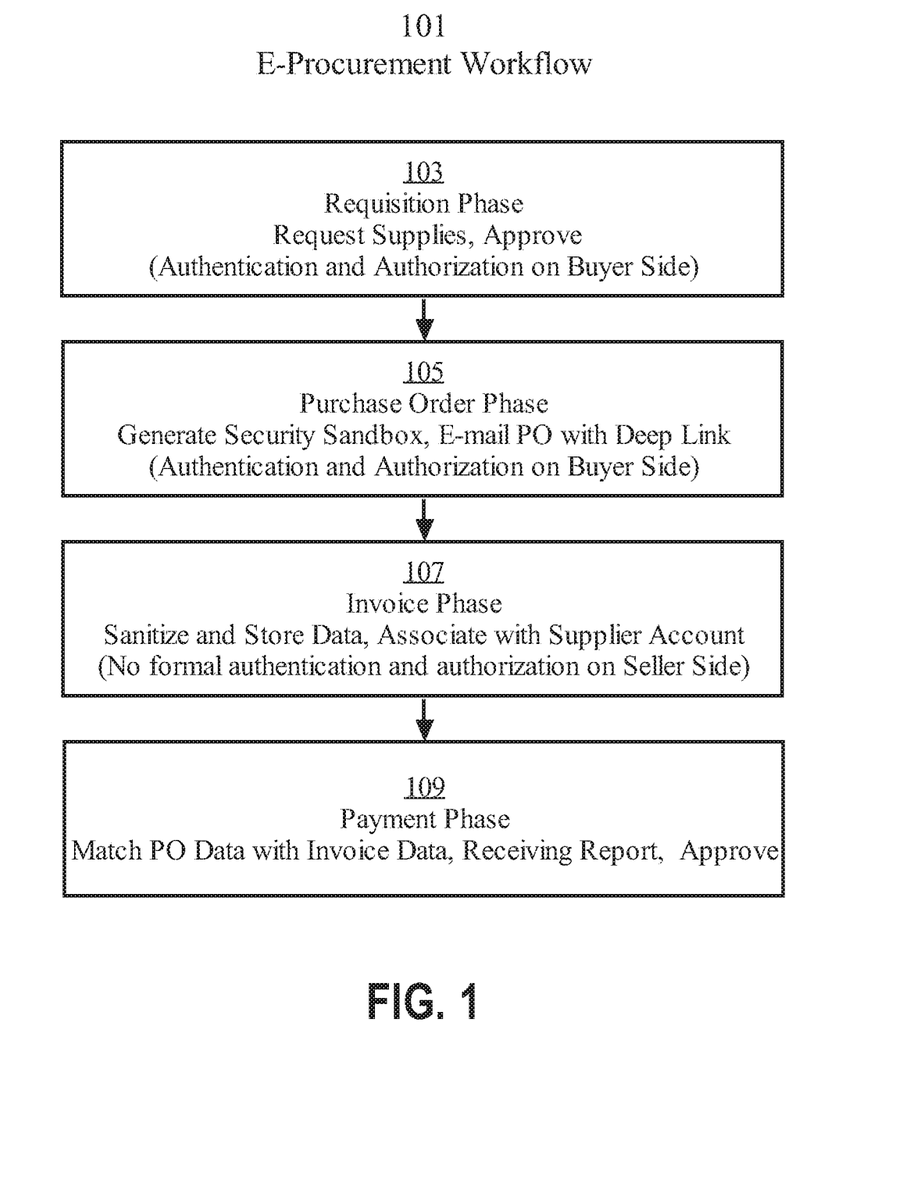
FIG. 1 is a flowchart illustrating phases for an integrated E-procurement workflow.

In some embodiments, a secure E-procurement system is provided with four integrated phases: a requisition phase 103, a purchase order phase 105, an invoice phase 107, and a payment phase 109. The system is designed to use actions from the requisition phase 103 or purchase order phase 105 as a substitute for the authentication and authorization usually required in the invoice phase 107.

In particular, each phase of the E-procurement process adds an incremental amount of data about the transaction. In the requisition phase 103, a description of product needed, an address of where the product needs to be shipped to, a supplier that has the product, and a base price can be added to the system. Upon approval, the process enters a purchase order (PO) phase 105 where additional information such as PO number, PO date, and payment terms may be added to the transaction.

In the PO phase 105, an electronic notification generated for the supplier can be used to create an account associated with a supplier. The account is also associated with data from a unique address within the security sandboxed portion of the system. The PO information may be imported into the security sandboxed portion of the system, so a page generated at the unique address can make use of the PO information. A unique link to an invoice data entry page in the security sandboxed portion of the system is added to the email before it is sent.

In the invoice phase 107, a supplier adds information such as invoice number, invoice data, taxes, and additional payment terms to the transaction. By using the unique link to the unique address, a client is automatically associated with a supplier account, and information coming from the page may be classified as coming from that account. Thus, a supplier can click on the link without having to pre-register or log in to access an invoice data entry page from the security sandboxed portion of the system.

The supplier may then enter a minimal amount of data, delta_invoice data, in order to generate an invoice. Delta_invoice data may best be understood according to the following equation:

$$PO\_Data + \Delta\_Invoice \geq Invoice\_Data$$

Any DELTA_Invoice data received in this way is scanned before being stored as associated with the supplier account. Finally, the access policy to the security sandboxed portion of the system is updated for that unique address, and confirmation is sent to the supplier.

In the payment phase 109, a buyer adds information to the transaction such as a receiver report, an inspection report, payment date, and payment account information. This information may be used as an additional layer of validation on the Δ Invoice data added in the invoice phase 107. For example, the PO data should match the receiver data, which should match the invoice data. Once matching is achieved to a threshold tolerance level, payment is approved.

Security Sandboxed Portion of a System

Figure 2:
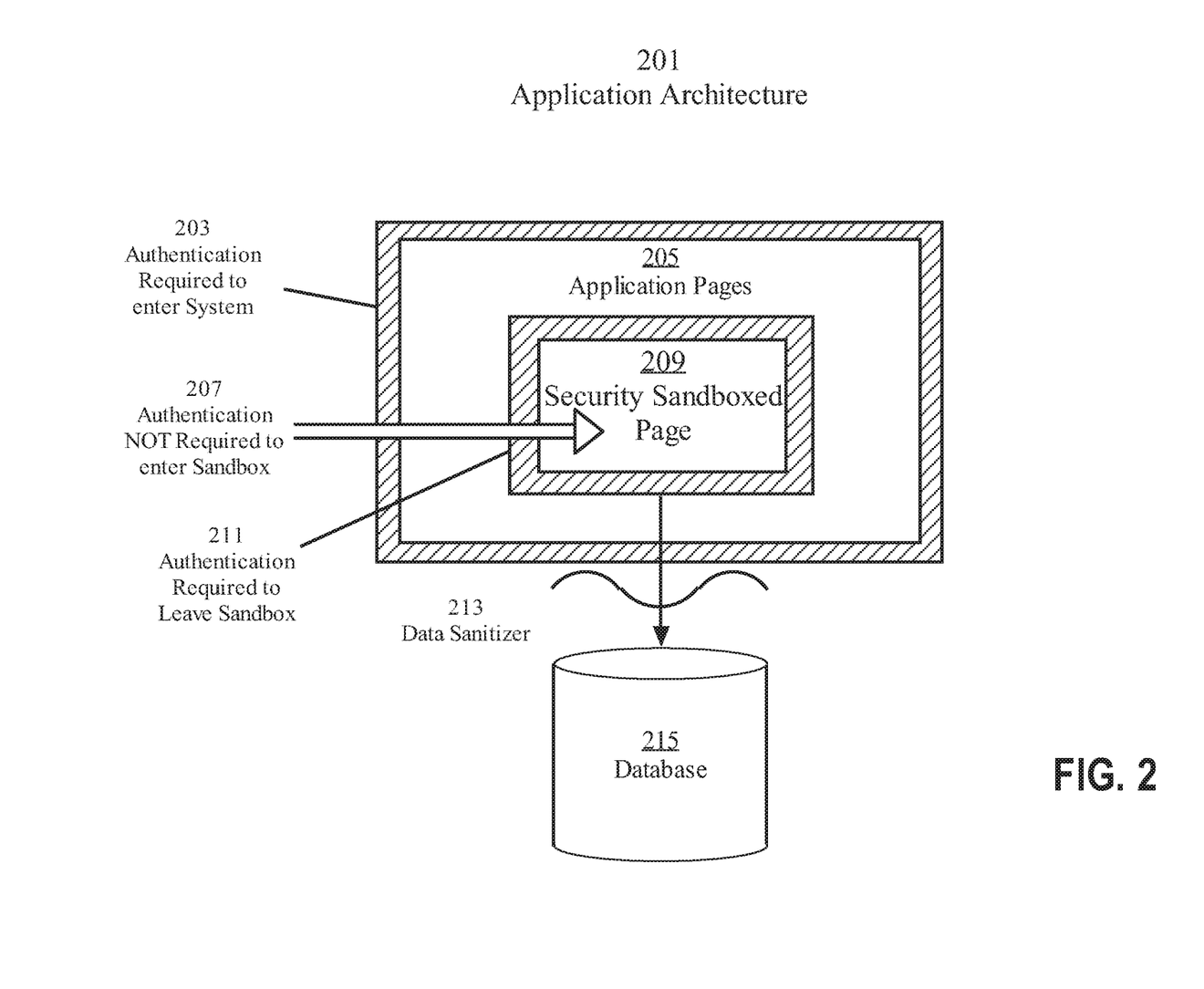
FIG. 2 is a block diagram illustrating a security sandboxed application architecture.

In some embodiments, one or more networked computer systems host a web application program that is secure through log in credentials. A portion of this system is security sandboxed and does not require receiving or validating log in credentials. A network hosted security sandboxed application architecture 201 is illustrated in FIG. 2.

The application architecture 201 comprises a collection of application pages 205 connected to a database 215. Authentication procedures are required to enter the system 203, but once log in information is entered once, the user no longer needs to enter log in information to access all of the application pages 205 that the user is authorized to use. This may be implemented using cookies or a server side session variable associated with the client. After a log in, the client is given a token, and a computer or server hosting the application compares the token to a list of tokens granted access before granting access to a secured page.

Users do not need log in information to enter the security sandboxed portion of the application 207. The sandboxed portion 209 of the application has security mechanisms in place that only allow a user access to a controlled set of resources. The controlled set of resources may be a single page for accepting data. In some embodiments, portions of the application are executed on a client device. Encryption techniques with decryption mechanism in a browser add-on or using the sandbox attribute in HTML 5 may prevent scripts from running on the page. Essentially, only a minimal amount of resources are sent to the client that allow the client to send data such as POST data to a controller file for scanning.

In some embodiments, scripts run in the page searching for external web add-ons and plugins. The scripts may request that these add-ons be disabled before allowing the client to fully access the page. In some embodiments, additional access for inspecting lower level parts of the web application are disallowed. For example, while a page may normally contain rich XML data, the system may modify the content and only allow the client to view skeleton HTML content after it has been processed.

In some embodiments, scripts run in the page to send additional metadata regarding the data input into a page. This metadata may include system information of the host computer.

Figure 4:
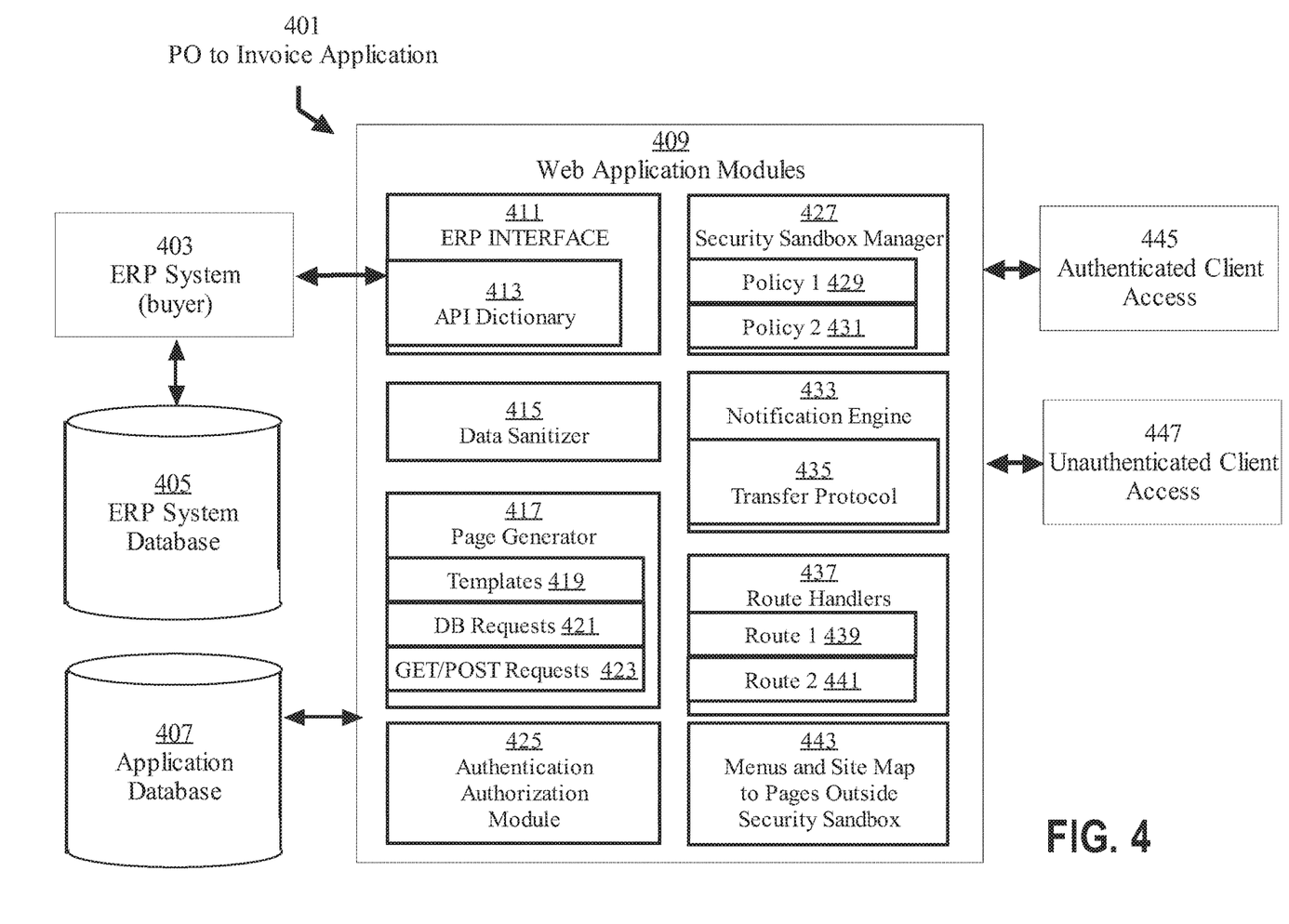
FIG. 4 is a block diagram illustrating an application blueprint for transforming purchase order into an invoice.

In some embodiments, in response to receiving data from an unauthorized client, a security manager 427 is given an opportunity to prevent completion of the operation by throwing an exception. The security manager may be invoked as an instance with a set of security check methods known as a policy that accept the data streams being sent as arguments as well as any metadata sent for flagging security threats. Security threats include, but are not limited to, malware, viruses, Trojans, and spyware, as well as flagged connection information. Connection information may additionally comprise a sender's metadata. In some embodiments, a security threat exists when connection information does not compare with stored connection information. Network access to other parts of the web application from the sandboxed portion of the system requires registration or log in validation 211. Attempts to access other parts of the system through the address bar without login information may be controlled through route handler policies. For example, in Node.js multiple routing middleware components may be set up to differentiate between an unauthenticated client and authenticated clients. The host server uses different route handlers depending on the user.

Users trying to access unauthorized parts of the system are redirected back to the security sandboxed portion 209 of the system, which may include a splash page, error page, or log in page. Other embodiments simply lock the client out of the system by updating authentication policy required for entering the security sandboxed portion of the system. Repeated attempts or attacks on the system may be logged and associated with the IP of the client attempting to attack the system.

In some embodiments, a data sanitizer 213 scans any data transferred from the security sandboxed page and modifies or drops the data as necessary before transferring the data to a database. Simple data sanitizers may scrape the input data for bad input, JavaScript, expletives, and nefarious queries such DROP TABLE using regular expressions. More advance data sanitizers may act as a firewall, scanning all data for viruses, spyware, executables, phishing, and any other suspicious code before transferring the code to other portions of the network application.

In some embodiments, after the data has been scanned and modified or dropped as needed, the data is then transferred to a database 215. The database may be local on the host server or remotely accessed through the network.

Temporary Access to Sandboxed Portion of a System

Figure 3:
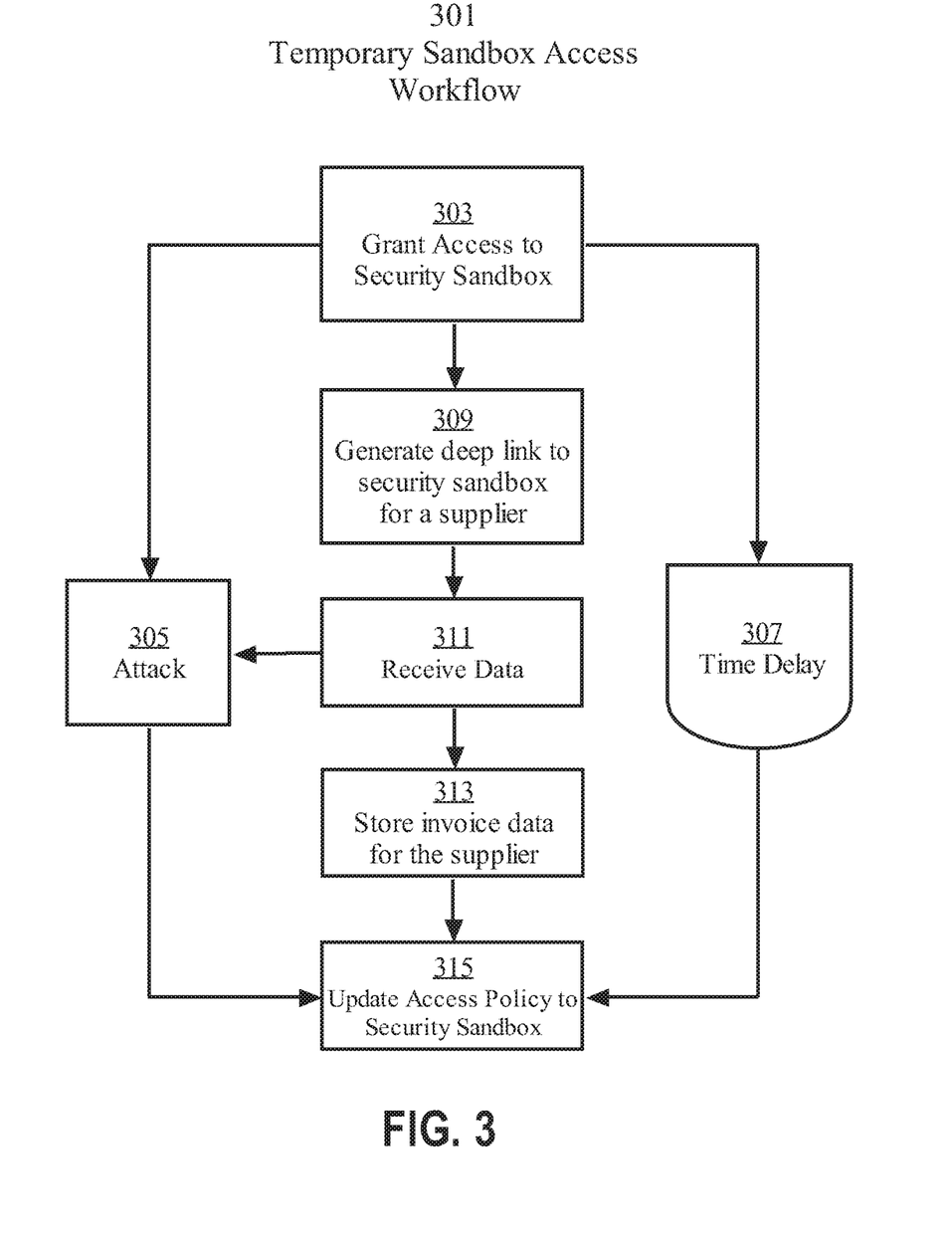
FIG. 3 is a flowchart illustrating steps for receiving data from a security sandboxed portion of a system.

In some embodiments, a computer system hosts a web application that temporarily grants access to a security sandboxed portion of the web application without receiving or validating log in credentials. A workflow 301 for granting temporary access to a security sandboxed portion of a web application is illustrated in FIG. 3.

In some embodiments, a triggering event causes the system to grant access to the security sandbox portion of the system. An example of such triggering event is final approval by an authorized user of a requisition to become a purchase order. In some embodiments, access is granted when a logged in user grants access to the security sandbox. Granting access 303 to the security sandbox starts an expected workflow of a web application. In some embodiments, the temporary access is granted for a period of time as long as the system performs operations according to an expected workflow. For example, an operation step that fails mid operation, such as generating a link 309, may throw an error that updates the security sandbox to prevent unauthenticated access.

Additional events may cause the security sandbox to prevent unauthenticated access. In some embodiments, the security sandbox portion of the system recognizes attacks 305 and turns off access permissions entirely. An example of an attack may be multiple bots attempting to access the page at the same time. In some embodiments, a threshold period of time 307 causes the security sandbox to prevent unauthenticated access.

Assuming the computer system does not meet an event that triggers denial of temporary access, the computer system generates a link 309 to the security sandboxed page. The link may then be sent to a user using an electronic notification. Examples of electronic notifications include, but are not limited to, emails and instant messaging.

The link is associated with an account in the application program. This account may be associated with supplier information imported from a buyer's enterprise resource planning software. Alternatively, this account may be associated with supplier information imported from a purchase order generated within the web application. Thus, when the computer system receives data 311 through the security sandboxed portion of the system, the data may be stored 313 as associated with a specific supplier.

Once the expected steps have been performed, the system updates 315 the security sandbox to prevent unrestricted access.

Integration with ERP System

In some embodiments, the host computer granting temporary access to a security sandboxed system is integrated with an enterprise resource planning system. An enterprise resource planning system is a business management system that provides centralized management over product development, manufacturing delivery, marketing, sales, inventory management, shipping, and payment, or a subset of these areas. The system is designed for a single entity to have an integrated view of core business processes using a database management system. With this system, a single entity may track business assets and compare them with business liabilities. Because the system aggregates a plethora of useful information, the system may provide an application programming interface (API) for accessing data in the system directly. Because some of these systems provide functionalities such as automatic payment, access to the system by arm's length entities must be limited to specific import and export functionalities.

For example, FIG. 4 illustrates an ERP system 403 connected to a PO to invoice application 401 through and ERP interface 411. The PO to invoice application 401 is accessible to both buyers and suppliers as an authenticated client 445 or an authenticated client 445. Under normal operations, a buyer creates an account and is granted access to the various functionalities of the software through authentication and authorization module 425. The module may store the client's information and additional information in an application database 407.

Once a client has access to the system, the client may not wish to individually enter all of the suppliers that they do business with. In this case, integration with an ERP system 403 is valuable. The client may provide access credentials for their own personal ERP system 403. Then, the ERP interface 411 may access an API 413 to import ERP data 405 from the ERP system 403. Every client may have their own ERP system, but only one ERP system 403 is presented in FIG. 4 for illustrative purposes.

The ERP interface 411 leverages a public or private API 413 to access the system. For example, a public API is a specification of remote calls such as SOAP and REST that are available to a connected application. Private API's are developed in house or by a private entity to access the system.

ERP Data 405 from the ERP system 403 may be accessed in an "eager" or a "lazy" fashion. An example, of data pulled in an eager fashion includes a list of suppliers and addresses used by the client. This information can be stored directly in the application database 407, so a client can gain quick access when forming a requisition or PO. An example data transferred in a lazy fashion is pulling a receiver report from the ERP system when a three-way match is required. In some embodiments, even a purchase order may be pulled from the ERP system in a lazy fashion. Although the application 401 may have generated a local PO for a specific invoice, the PO information in the ERP System 403 needs to match the invoice in the ERP system before the invoice is approved for payment in these embodiments.

Security Sandbox Manager

In some embodiments, the application 401 has a security sandbox manager with different policies 429, 431. These policies relate to the level of access granted to the security sandboxed portion of the system. When the security sandbox is set up for unauthorized access, the sandbox manager 427 employs a first policy 429 that prevents that portion of the system from sending or receiving data that could be used to access other portions of the system. When the security sandbox is set up for only authorized access, the sandbox manager 427 employs a second policy 431 that allows a user to edit the data sent to and from that portion of the system. For example, when the security sandbox manager is operating under the second policy 431, a client may be able to access the XML fields that are filled in by another client with invoice data. When the security sandbox manager is operating under the first policy 431, a client may only be able to receive the XML document as an HTML document, so as to place data in the required fields.

Page Generator and Deep Linking

In some embodiments, a page generator 417 requests data from the ERP system 403 using standard database requests 421 to the ERP interface 411 and from the local application database 407. Additionally, the page generator 417 may have GET/POST requests to receive data from the authorized client 445 to create pages from one or more templates 419, such as an XML template. The page generator 417 may construct a requisition data entry page using a list of suppliers from the ERP data 405. The page generator 417 may then construct a purchase order using information from a requisition page, and then, automatically create a PO number for the purchase order by incrementing from the last PO number used by the client in the application database 407. The page generator 417 may construct an invoice data entry page using the purchase order information and a list of required fields. The page generator 417 may also construct a template for a receiver report.

Each page created by the page generator has a unique address that may or may not be visible to the client accessing the page. For example, the address to pages in a portion of the security sandboxed system may have a masking URL such that a client gains no information from accessing that portion of the system. An identifier to each unique address may be generated using a hash function with the time and date used as the hash key. The URL of any page may be sent to the electronic notification engine 433 to be transferred to an outside client such as a supplier.

Electronic Notification Engine

In addition to workflows on the network that require a page generator 417, some workflows require an electronic notification engine 433. As with the page generator, the electronic notification engine 433 pulls data from the ERP system 403, the application database 407, and the various client 445, 447 inputs to generate content that goes into an electronic notification. In addition, the electronic notification engine 433 uses a transfer protocol to transfer this information. Examples of application level transfer protocols include SMTP for email, XMPP for data messaging, or SMS for phone messaging.

Depending on the protocol a sending address, number, username, or other identifying information may be used to create an account associated with a link to a security sandboxed portion of the system. For example, using SMTP protocol, any command with the following structure may be used to generate an account.

RCPT TO:<name@example.com>

In some embodiments, the account may be considered a group account where all receivers or a subset of the receivers are considered to be associated with the account.

In a preferred embodiment, a URL generated by the page generator is received by the electronic notification engine 433 and sent to an outside client 447 using an application level transfer protocol 435. In some embodiments, the link is by itself with short message of what it links to, in other embodiments the link is accompanied by information pulled from various sources 405, 407, and 445. In a preferred embodiment, the link is emailed with a purchase order as presented in FIG. 6. However, similar concepts may be used to email the link with a requisition page, an invoice page, a receiver page, a confirmation page after a two or three-way match, or a confirmation 531 page for successful execution of data entry presented in FIG. 5. In these embodiments the page may be complete or incomplete, and accessing them on the network through a link after viewing them in an electronic notification allows for creating or editing information on the page.

In some embodiments, the electronic notification contains a link of a security sandboxed purchase order page located on the network. After reviewing the page, an unauthenticated client 447 may click a link within this page to an invoice data entry page still within the security sandboxed portion of the system. For example, after receiving an email depicted in FIG. 6, an unauthorized client 447 may click the link 623 to arrive at a webpage that looks like FIG. 6. The unauthorized client would have to click a link on this page to enter a data invoice page such as the one depicted in FIG. 7.

Figure 7:
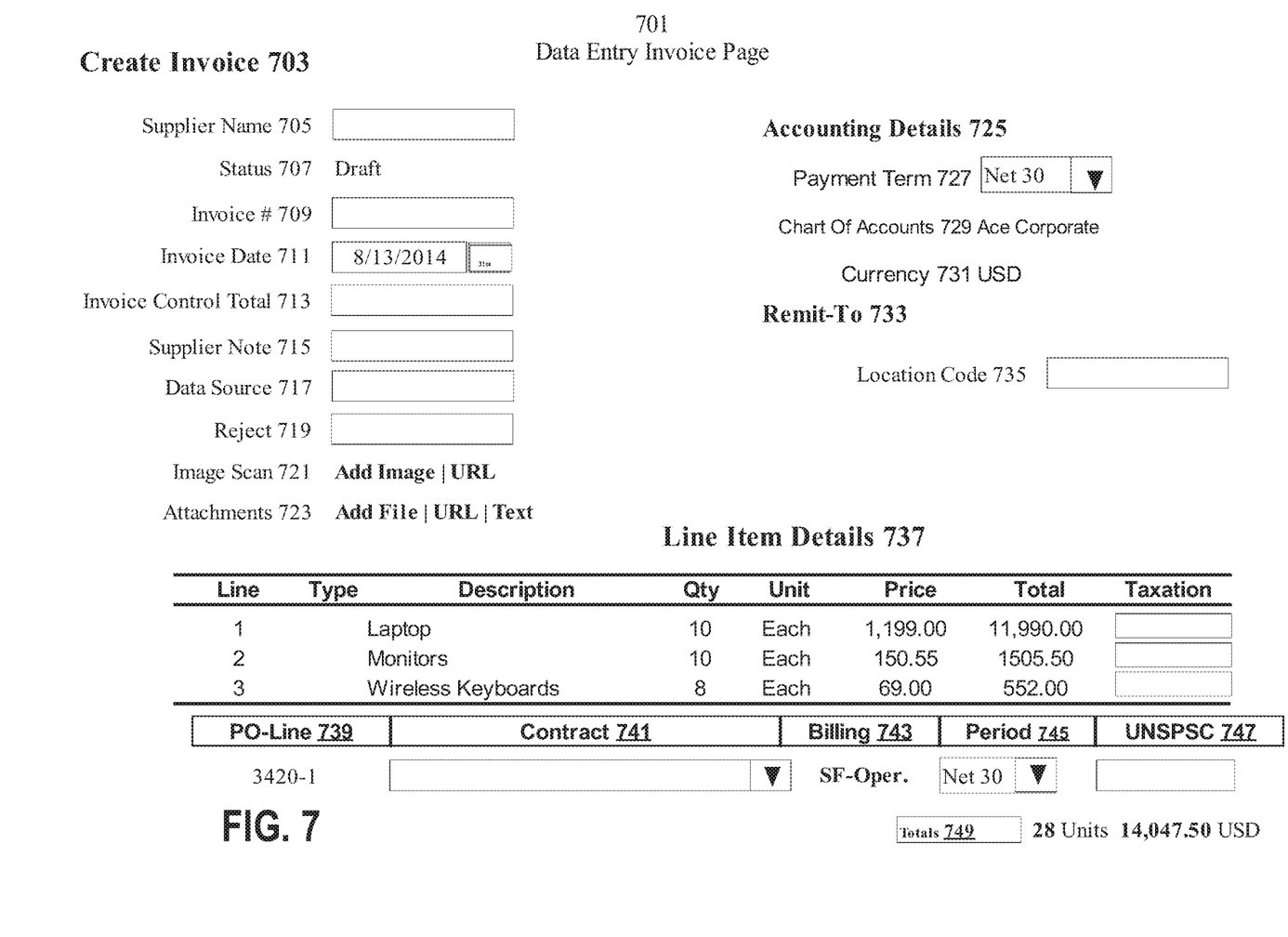
FIG. 7 is a schematic template illustrating a data entry invoice page.

In some embodiments, the email contains a link straight to the security sandboxed invoice data entry page. An unauthenticated client may click a link within this page to view the associated purchase order page still within the security sandboxed portion of the system. The unauthenticated client can further use the back button or another link to return to the security sandboxed invoice data entry page.

Route Handlers

Route handlers 437 provide a layer of traffic coordination for the web application system. In some embodiments, the route handlers 437 take URL information and redirect the user to different portions of the system. For example, if a client enters a unique URL created by the page generator, the route handler can recognize the URL request and direct the client to a data entry page generated for that client at a different domain masked URL. In other cases, a client may enter a data entry page URL that does not exist or click on a link that has expired. Rather than giving a 404 error, the route handler can re-direct the client to a page explaining the problem. The page may also provide for log in credentials or a generic invoice data entry page which allows the person to create or update their invoice information even though the URL did not work.

Different route handlers may be called depending on the client seeking access. For example, an unauthenticated client 447 may be granted access to a data entry invoice page, while an authenticated client 445 may be granted access to a different page that looks similar but has more permissions.

Data Sanitizer Module

In some embodiments, a data sanitizer 415 scans any data transferred from the security sandboxed page and modifies or drops the data as necessary before transferring the data to a database. Simple data sanitizers may scrape the input data for bad input, JavaScript, and nefarious queries such DROP TABLE. More advance data sanitizers may act as a firewall, scanning all data for viruses, spyware, executables, phishing, and expletives.

In some embodiments, the data sanitizer module 415 is tailored to adjust for commonly made errors that are application specific. For example, if customers commonly enter a '$' when entering a tax value in the data entry page, the data sanitizer module 415 can remove all '$' from that entry. Similar benefits could be stylizing data entry to always be capitalized in the same way or removing stylization tags such as bold or italic before transferring data into a database.

Leaving the Security Sandboxed Page

In some embodiments, a data entry page may have buttons, links, and menus 443 that encourage an unauthorized client 447 to enter different parts of the application 401. For links to pages with secure information, the application may require log in credentials or a registration page through the authentication module 425. Because the user is already associated with an account, the log in credentials given may be further associated with the pre-generated account. For links to pages of unsecure information, authentication is not necessary. However, the unauthenticated client may still be granted a cookie or session variable to connect the pre-generated account information to the client's personally create account should the unauthorized client attempt to log in page register.

Implementation

Figure 5:
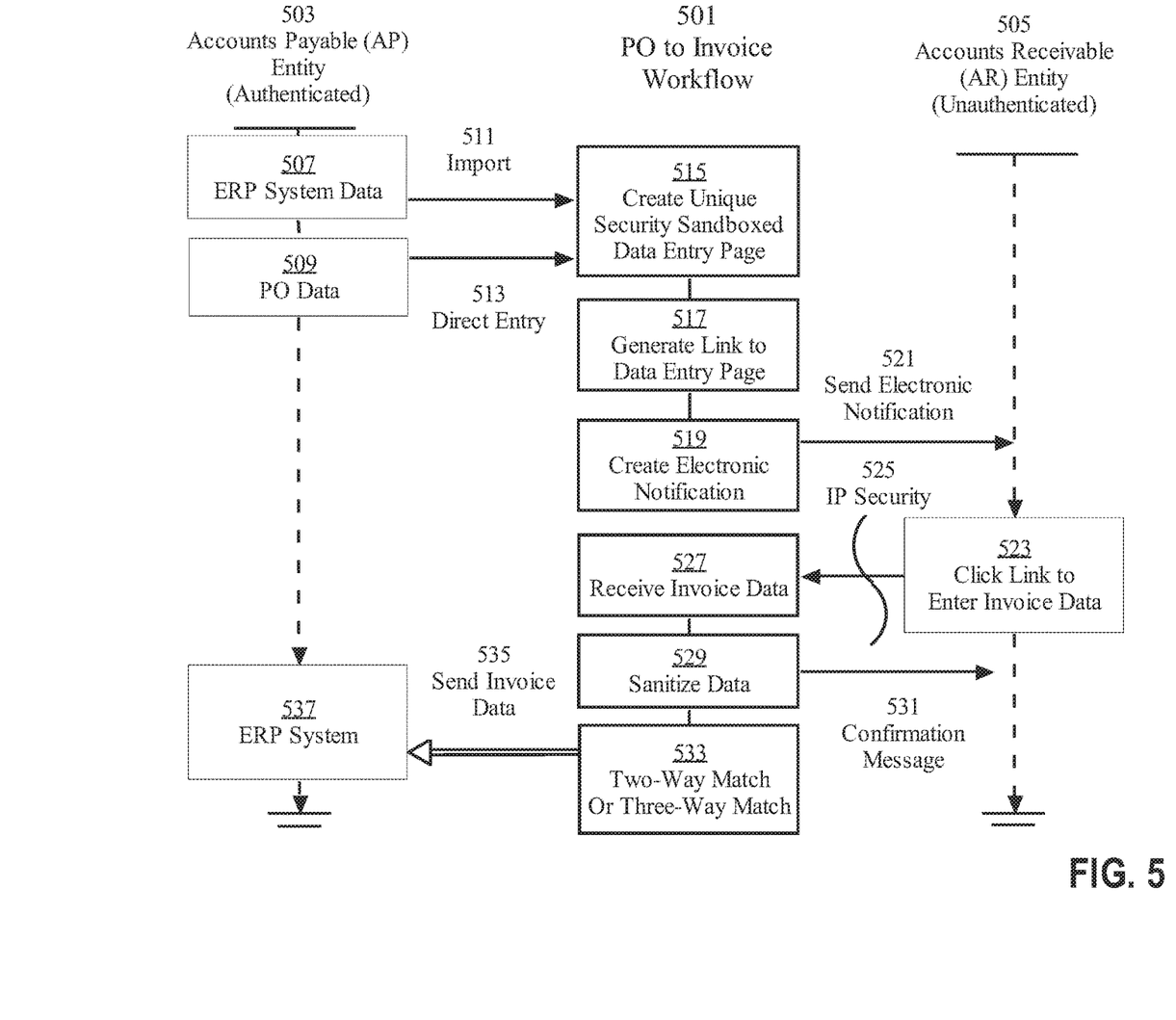
FIG. 5 is a flowchart illustrating steps for transforming a purchase order into an invoice.

In some embodiments, one or more networked servers hosting a web application receive data necessary to generate a purchase order from an accounts payable entity. The data may be transferred through multiple channels. For example, some data 507 is received from the accounts payable ERP system. Other data 509 is received directly from a client entering the data in a requisition or purchase order form. Data received in these manners may be temporarily stored in a buffer cache before it is needed. The data may also be first stored in an application database 407 and then retrieved from the database.

The data 507, 509 collected from a purchase order includes, but is not limited to, a logo for the supplier, a logo for the buyer, a brand name, a supplier name, a supplier address, a buyer shipping address, a buyer billing address, a purchase order number, a date, payment terms, shipping terms, currency type, contract information, contact information such as name, phone number, email address, fax, or username for a messaging service, line item descriptions of goods further including quantity, batch pricing, price, subtotal pricing, total pricing, total number of units, or any combination thereof.

In some embodiments, after receiving the first set of data 507, 509 a host computer automatically generates a security sandboxed data entry page 515 for generating an invoice having a unique web address within a web application. The security sandboxed data entry page comprises fields and data associated with some of the received data necessary to generate a purchase order. For example, the data entry page may include the same line item description of goods, but may not include shipping information.

In addition, the invoice data entry page includes a collection of fields associated with information necessary to process an invoice. The field labels are associated with field inputs such as text areas and other input types such as radio buttons, drop-down lists, check boxes, file input, URL input, optical input adapted for receiving logos, pictures, QR codes, bar codes, or other forms of pictures, and customize inputs for receiving other information such as radio frequency identification (RFID) or magnetic input.

These fields include, but are not limited to, a supplier name, a status, and invoice number, and invoice date, and invoice control total, a supplier note, a data source, a reject field, an image scan, other attachments, a payment term, a chart of accounts field, a remit-to field, a location code, a PO line, tax information, a contract field, a billing field, a period field, a UNSPSC field, or any combination thereof. These fields may also include some or all of the data necessary to generate a purchase order, with the ability to edit the information in some modes, and no ability to edit this information in other modes.

After generating the data entry page, an application server automatically generates link to the page 517. In some embodiments the link comprises the actual address of the page. In some embodiments, the link comprises information for a route handler to redirect a client to the page.

After creating the link, one or more servers generates an electronic notification with the link to the invoice data entry page 519. The electronic notification is directed towards an address or username of the supplier or suppliers that are meant to fulfill the purchase order. This may be through email, SMS, instant messaging, any other form of electronic notification, or multiple forms of electronic communication. In a preferred embodiment, the electronic notification is sent 521 automatically. In some embodiments, the electronic notification requires manual confirmation or editing before sending.

In some embodiments, the link is embedded in an electronic notification of a purchase order from the buyer to the supplier. For example, an email is generated and sent to a supplier when a purchase order is created or approved from a requisition. This email includes an additional link or button to the invoice data entry page. The email identifies the link as giving the supplier access to the invoice data entry page without requiring the supplier to register or log in to access the page.

After the supplier(s) receives the message, a supplier may click 523 on the link or button and enter data into the previously mentioned fields of the data entry page. Although this action does not require entering log in information, some embodiments of the invention may include an IP address security check 525 before allowing the supplier to receive the data entry page. In some such embodiment, the IP address of the client attempting to access the page would be compared against a whitelist record, a blacklist record, or both. In the white list embodiments, only known IP addresses or IP addresses from expected geographic locations are allowed to access the data entry page. In the blacklist embodiments, specific IP addresses or geographic locations are denied access to the data entry page.

A second set of data entered in the data entry page is received 527 and sanitized 529 before it is transferred to local memory or an external system. In some embodiments, during the process the second set of data is also associated with an account. This account is further associated with the address or username that was originally sent 521 the electronic notification. In this manner, a supplier may be associated with an account even though the supplier never personally created an account.

In some embodiments, after this invoice data is sanitized and associated with an account the host server running the web application may delete the page or URL associated with the data entry page. In some embodiments the security sandbox portion of the system is changed to an authentication required policy. Thus, a client may attempt to go back and change their data, but they may have to request another link to the security sandboxed service.

In some embodiments, after this invoice data is sanitized and associated with an account, the data is temporarily stored until it can be matched 533 with other reports regarding the billing, shipping, and receiving. For example, a three-way match refers to comparing the PO line item quantity and prices with the invoice line item quantity and prices and the receiving report line item quantity and prices. Further matching may occur through product id numbers or detailed descriptions of the products. This matching 533 does not need to occur all in one step. For example a PO number may be matched with an invoice number instantly and stored in a local database until the system receives a receiving report for matching. Other embodiments include only two way matching between the purchase order and the invoice or even four way matching among a purchase order, invoice, receiving report, and inspection report. Once all data is properly matched, an indication may be sent directly into a client ERP system for payment.

In some embodiments, the one or more steps in the described implementation process cause a confirmation electronic notification to be sent to the buyer, the supplier, or both. For example, as presented in FIG. 5, after invoice data is received and successfully sanitized, a confirmation 531 message is sent to the accounts receivable entity that entered the invoice data. This confirmation message may be an electronic notification, a page in the application, or both. Additionally, after a successful match, invoice data is sent directly to an ERP system 537. An additional electronic notification may sent to the buyer or supplier in response (not shown). This electronic notification may be a message when the buyer logs into the web application in the future. This electronic notification may also be an email.

Purchase Order Electronic Notification

When a buyer produces a purchase order using a web application running on one or more host servers, the web application may automatically send an electronic notification to a supplier that is meant to fulfill the purchase order. In some embodiments, this electronic notification comprises an email with an attachment of the purchase order. In some embodiments, this electronic notification comprises an email with the purchase order in the body of the email. Other electronic notifications include messaging within a host program and SMS. However, the electronic notification is produced, the notification contains a link to a security sandboxed invoice data entry page.

Figure 6:
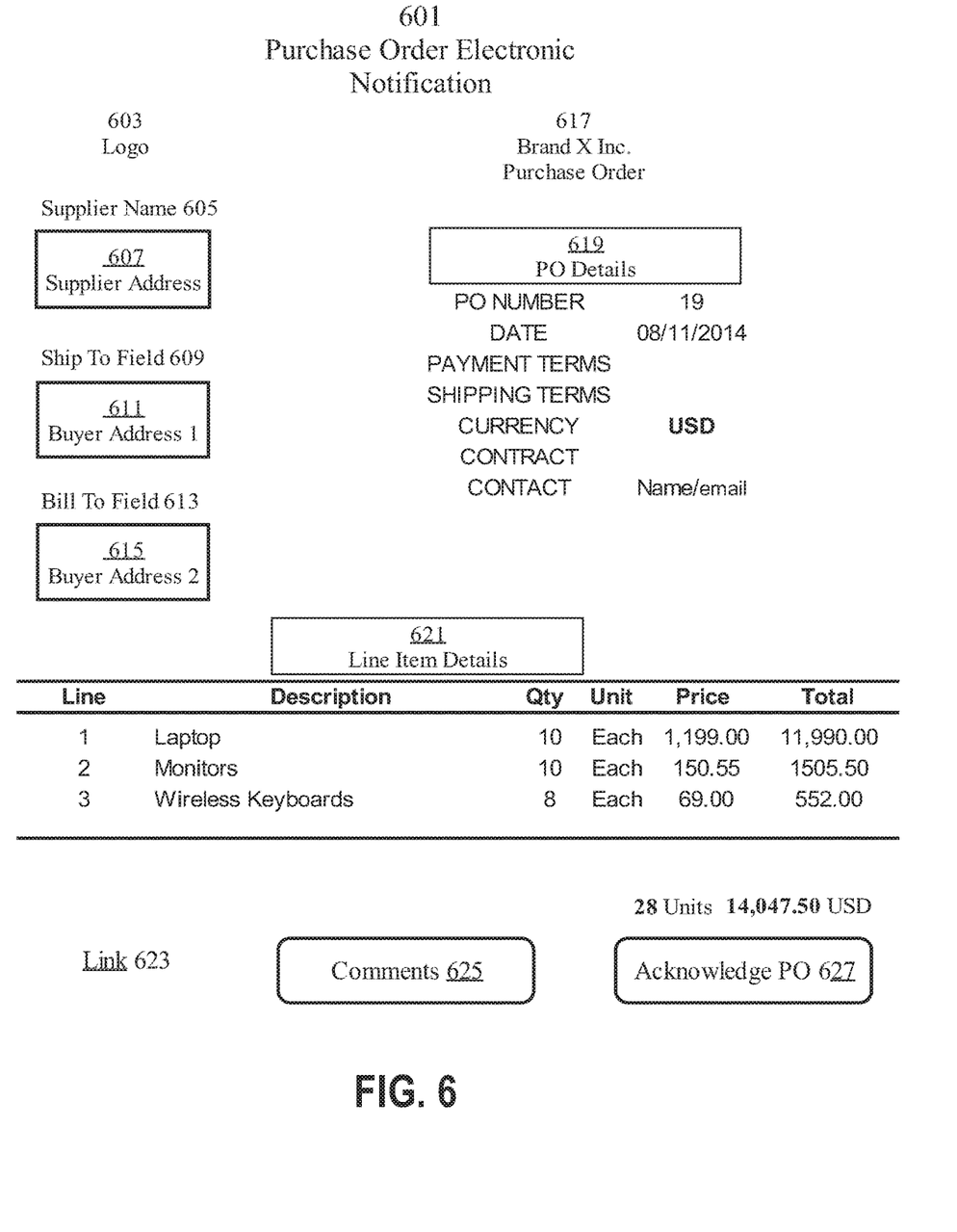
FIG. 6 is a schematic template illustrating an emailed purchase order with a link to a data entry page.

For example, in FIG. 6 a purchase order notification 601 is generated by electronic notification engine 433 from FIG. 4. The email notably contains a link 623 to a security sandboxed data entry page generated by the page generator 417 with policies managed by the security sandbox manager 427. The other information in the purchase order email may be pulled from different sources within the system. The engine 433 pulls data from the ERP system 403 or the local application database 407 to gain specific information about addresses 607, 611, and 615. Other information, such as the line item details, are derived directly from data entry of the buyer when creating the purchase order information or the previous requisition document. Still other information may be generated solely from local data. For example, in the PO details 619 this PO NUMBER may be generate by incrementing the previous PO number and the data may be generated by requesting the date from the host computer.

Additional links 625, 627 provide functionality to the network without requiring the supplier to log in. For example, clicking comments 625 allows the supplier to generate comments regarding the purchase order information. The comments are automatically stored and sent to the buyer within the networked system. As another example, click Acknowledge PO 627 causes a notification to the buyer within the networked system.

Invoice Data Entry

In some embodiments, a link is sent in an electronic notification grants access to an invoice data entry page. The data entry page comprise fields for input data that were not included in the original purchase order data. Some fields may have been included in the PO form, but are editable by the supplier when creating the invoice.

For example, FIG. 7 illustrates a data entry invoice page with a supplier name 705 field. Although this data was included in the purchase order, this field may be left open, so a supplier can define its own name when filling out invoice information.

In some embodiments, the supplier may wish to access the invoice multiple times before sending the finalized invoice. In some such embodiments, a status indicator can show whether the invoice is a draft or finalized and ready for sending. For example, the invoice data entry page in FIG. 701 is in a draft 707 state because many of the fields have not been filled in.

Some embodiments include an invoice control total 713 field. The invoice control total provides for the number of invoices created by that supplier. The invoice control total can help a client system and the host web application check for errors when the numbers fail to match.

Some embodiments include a data source 717 field. The data source 717 field indicates where at least some of the data from the invoice data page came from. For example, the data source for a supplier made invoice may be stored in a particular database. A The United Nations Standard Products and Services Code (UNSPSC) 747 field may be included to define the nature of the transaction. In Ecommerce, a four-level hierarchy coded as an eight-digit number allows vendors and buyers to classify the nature products or services being purchased.

The invoice data entry page is an example of a message generated by the page generator. The page has fields and functionalities that are pulled as standard from local data, but other data such as the line item details 737 are pulled directly from the PO.

Confirmation

Figure 8:
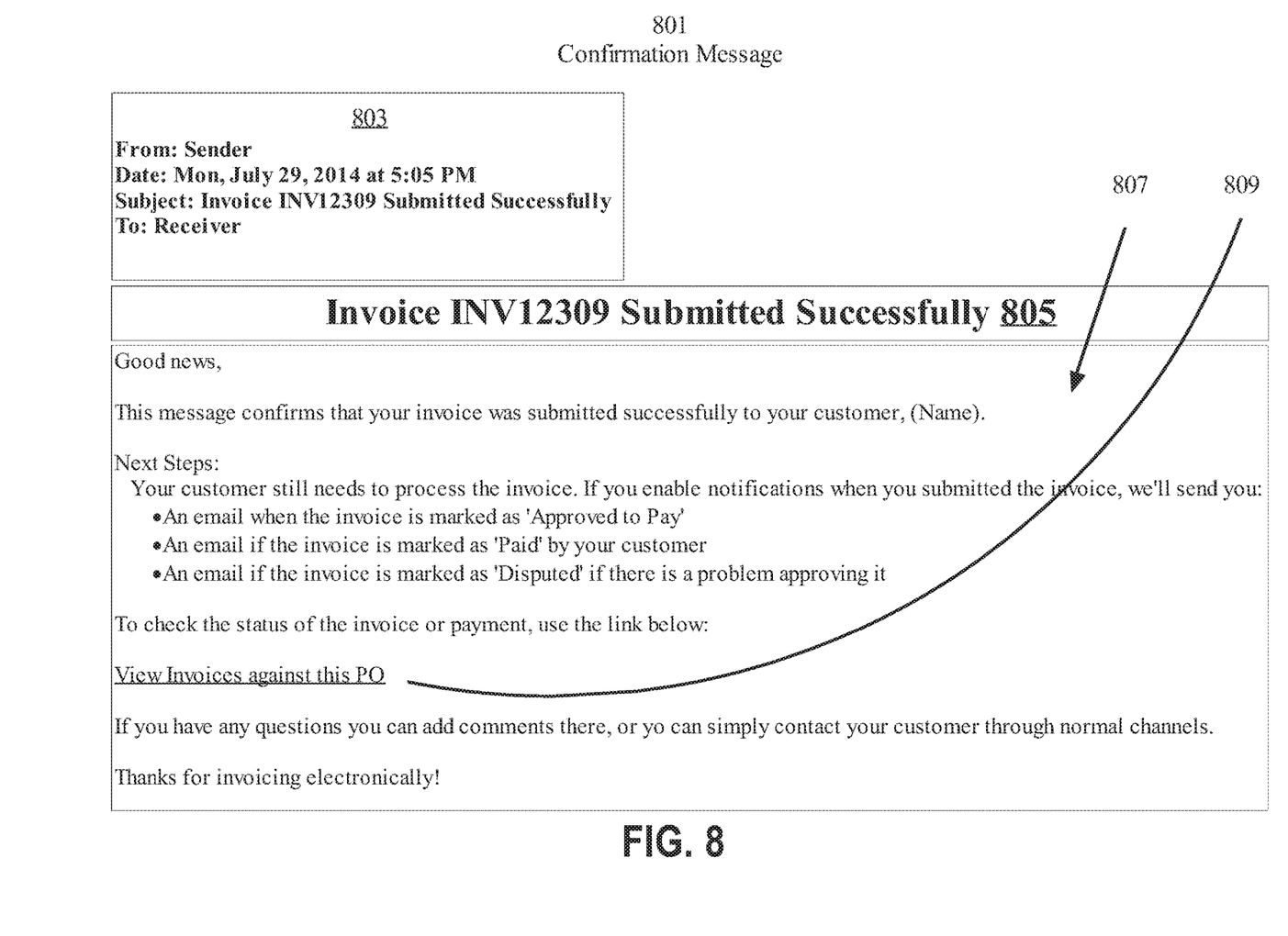
FIG. 8 is a schematic template illustrating a confirmation message.

In some embodiments, a confirmation message is generated after data is successfully sanitized and stored in a local application database. The confirmation message may be a page within the web application network or an electronic notification such as an email, a message, or an instant message transferred by a host application. Depending on the embodiment, the message is generated by the electronic notification engine 433 or the page generator 417. In some embodiments, the message is generated immediately after the invoice is sent. In some embodiments, the message is sent only as a confirmation email.

For example, FIG. 8 illustrates a confirmation message 801 sent by email after an invoice has been successfully submitted by a supplier using the security sandboxed data entry page. The message contains header information 803, a title 805, and a body 807. Within the body 807, there is link 809. In some embodiments, this link grants access to a security sandboxed portion of the system. In some embodiments, this link sends the client to a log in page.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
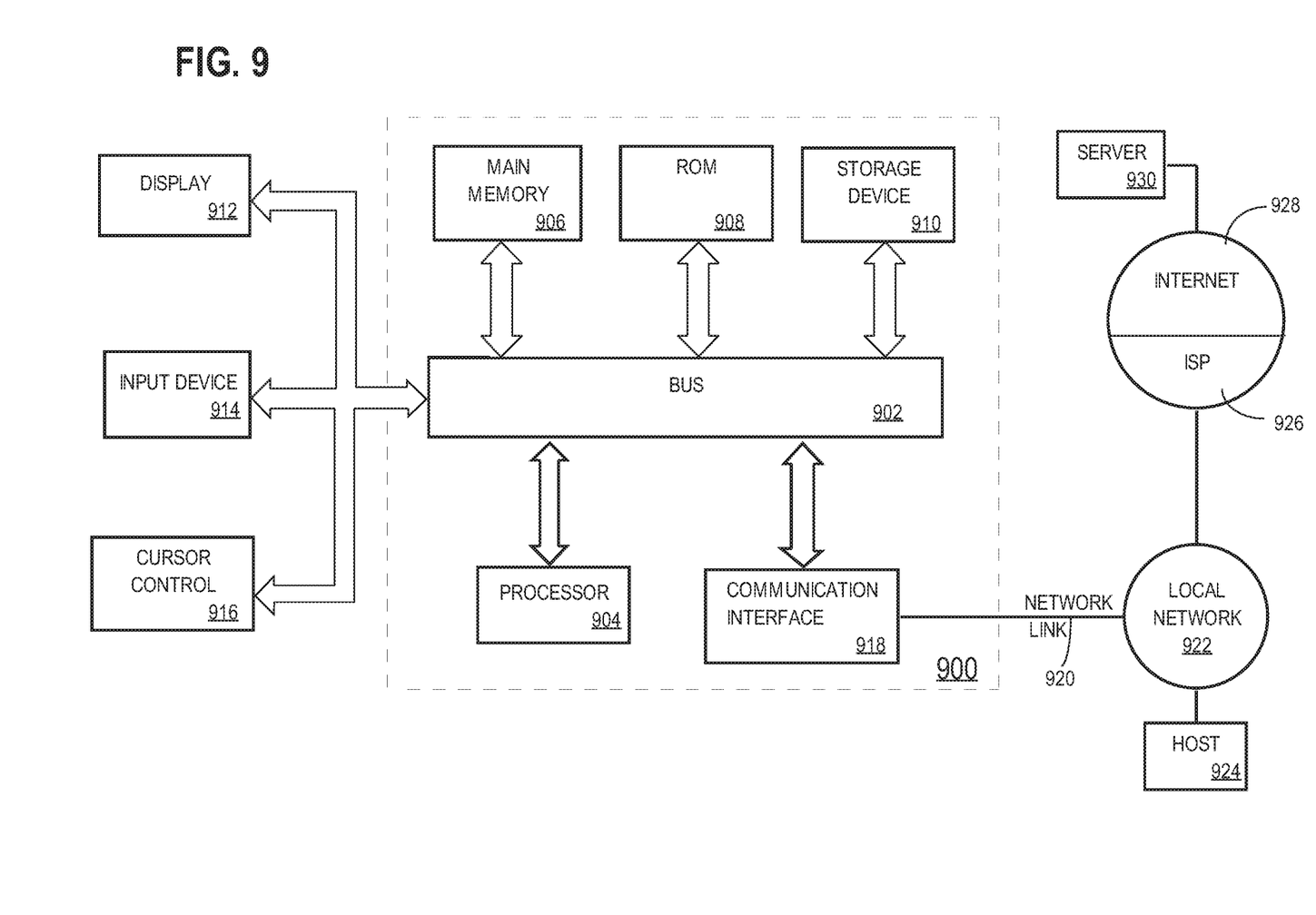
FIG. 9 is a block diagram illustrating a computer system that may be used to implement the techniques described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of improving the efficiency of executing procurement tasks, comprising:
    using an application server computer, receiving, from a first client, a first set of data including, a particular email address of a second client and a set of inventory requested by the first client with quantity information for each inventory, wherein the first client is an authenticated client and the second client is an unauthenticated client;
    wherein the first set of data is associated with fields defining purchase order information,
    using the application server computer, automatically generating a security sandboxed data entry page having a web address within a web application program, wherein the security sandboxed data entry page comprises at least some elements from the first set of data and is associated with a data processing function of the web application program;
    using the application server computer, the web application program temporarily granting access to the security sandboxed data entry page without receiving or validating log in credentials;
    using the application server computer, automatically generating an electronic notification with a link to the web address, and sending the electronic notification to the particular email address;
    receiving, from the second client through the security sandboxed data entry page, a second set of data, the second set of data associated with fields defining invoice information;
    deactivating the security sandboxed data entry page after receiving the second set of data;
    matching the second set of data with the first set of data to a certain tolerance;
    in response to the matching, storing the second set of data directly in a client database for the first client.

2. The method of claim 1, wherein the fields defining purchase order information comprise purchase order number and price; wherein the fields defining invoice information comprise invoice number, invoice date, and taxes.

3. The method of claim 1, further comprising storing a record of at least one IP address; wherein enabling the data entry occurs upon comparing the IP address from the record to an IP address associated with the second client.

4. The method of claim 1, wherein the security sandboxed data entry page includes additional links to pages within the web application program; wherein using the additional links comprises an authentication step.

5. The method of claim 1, wherein the method further comprises preventing unrestricted access to the security sandboxed data entry page after receiving the second set of data.

6. The method of claim 1, wherein the web address is a unique web address.

7. The method of claim 1, wherein the method further comprises matching the second set of data with the first set of data to a certain tolerance.

8. The method of claim 1, further comprising, receiving a third set of data including an indication related to the quantity information; and matching the third set of data with the first set of data and the second set of data to a certain tolerance.

9. The method of claim 8, further comprising, receiving a fourth set of data from including an indication related to the quantity information; and matching the fourth set of data with the first set of data, the second set of data, and the third set of data to a certain tolerance.

10. A server computer providing an improvement in the efficiency of executing procurement tasks, comprising:
    an interface configured to receive, from a first client, a first set of data including, a particular email address of a second client and a set of inventory requested by the first client with quantity information for each inventory, wherein the first client is an authenticated client and the second client is an unauthenticated client;
    wherein the first set of data is associated with fields defining purchase order information,
    a page generator configured to automatically generate a security sandboxed data entry page having a web address within a web application program, wherein the security sandboxed data entry page comprises at least some elements from the first set of data and is associated with a data processing function of the web application program;
    the web application program temporarily granting access to the security sandboxed data entry page without receiving or validating log in credentials;

a notification engine configured to automatically generate an electronic notification with a link to the web address, and sending the electronic notification to the particular email address;

an application database configured to receive, from the second client through the security sandboxed data entry page, a second set of data, the second set of data associated with fields defining invoice information;

a security sandbox manager configured deactivate the security sandboxed data entry page after receiving the second set of data;

an application server configured to match the second set of data with the first set of data to a certain tolerance;

an enterprise resource planning interface configured to, in response to the application server matching the second set of data with the first set of data to a certain tolerance, store the second set of data directly in a client database for the first client.

11. The server computer of claim 10, wherein the fields defining purchase order information comprise purchase order number and price; wherein the fields defining invoice information comprise invoice number, invoice date, and taxes.

12. The server computer of claim 10, further comprising an authentication module with a record of at least one IP address; wherein enabling the data entry occurs upon comparing the IP address from the record to an IP address associated with the second client.

13. The server computer of claim 10, wherein the page generator is configured to include, in the security sandboxed data entry page, additional links to pages within the web application program; wherein using the additional links comprises an authentication step.

14. The server computer of claim 10, wherein the server computer further comprises an authentication module configured to prevent unrestricted access to the security sandboxed data entry page after receiving the second set of data.

15. The server computer of claim 10, wherein the web address is a unique web address.

16. The server computer of claim 10, further comprising an application server configured to match the second set of data with the first set of data to a certain tolerance.

17. The server computer of claim 10, further comprising an application server configured to receive a third set of data including an indication related to the quantity information; and to match the third set of data with the first set of data and the second set of data to a certain tolerance.

18. The server computer of claim 17, further comprising an application server configured to receive a fourth set of data from including an indication related to the quantity information; and to match the fourth set of data with the first set of data, the second set of data, and the third set of data to a certain tolerance.

* * * * *